(12) United States Patent
Lusty et al.

(10) Patent No.: US 9,308,894 B2
(45) Date of Patent: Apr. 12, 2016

(54) FAST ADJUST TRAILER JACK

(71) Applicants: Robert H. Lusty, Alexandria, MN (US); James D. Oberg, Eagle Band, MN (US); Donald Sachs, Prior Lake, MN (US)

(72) Inventors: Robert H. Lusty, Alexandria, MN (US); James D. Oberg, Eagle Band, MN (US); Donald Sachs, Prior Lake, MN (US)

(73) Assignees: Robert H. Lusty, Alexandria, MN (US); James D. Oberg, Eagle Bend, MN (US)

( * ) Notice: Subject to any disclaimer, the term of this patent is extended or adjusted under 35 U.S.C. 154(b) by 164 days.

(21) Appl. No.: 14/157,274

(22) Filed: Jan. 16, 2014

(65) Prior Publication Data

US 2015/0197220 A1    Jul. 16, 2015

(51) Int. Cl.
*B60S 9/08* (2006.01)
*B60S 9/22* (2006.01)

(52) U.S. Cl.
CPC ..... *B60S 9/08* (2013.01); *B60S 9/22* (2013.01)

(58) Field of Classification Search
CPC .............................................. B60S 9/00–9/08
USPC ..................... 292/281, 60; 254/105, 418–425
See application file for complete search history.

(56) References Cited

U.S. PATENT DOCUMENTS

| | | | | |
|---|---|---|---|---|
| 2,664,073 A * | 12/1953 | Pine | ........................... | B66F 3/30 188/82.7 |
| 2,939,679 A | 6/1960 | Ryan | | |
| 3,024,870 A * | 3/1962 | Kramcsak, Jr. | ........... | B60S 9/02 188/5 |
| 3,179,457 A * | 4/1965 | Johnson | .................. | F16B 21/04 292/195 |
| 3,409,272 A * | 11/1968 | Rasmussen | ............... | B60S 9/08 254/425 |
| 3,595,527 A | 7/1971 | Douglass et al. | | |
| 3,957,249 A | 5/1976 | Williams | | |
| 4,316,601 A * | 2/1982 | Osborne | ................ | A01D 75/20 254/424 |
| 4,796,864 A * | 1/1989 | Wilson | ...................... | B60S 9/08 254/103 |
| 4,842,252 A * | 6/1989 | McMahan | ............... | G02B 23/16 254/424 |
| 5,282,605 A * | 2/1994 | Sauber | ..................... | B60D 1/66 254/420 |
| 5,423,518 A * | 6/1995 | Baxter | ..................... | B60S 9/08 254/419 |
| 5,470,167 A * | 11/1995 | Benckert | .................. | B60S 9/02 248/409 |
| 5,509,687 A * | 4/1996 | Thorndike | ................ | B60S 9/12 254/419 |
| 6,526,788 B2 * | 3/2003 | Finkelstein | ......... | E05B 65/0053 292/145 |
| 7,611,160 B1 * | 11/2009 | Ignacio | ..................... | B60S 9/08 254/418 |
| 8,091,922 B2 * | 1/2012 | McMahan | ................. | B60S 9/08 254/420 |
| 8,714,528 B1 * | 5/2014 | Young | ...................... | B60S 9/04 254/419 |
| 8,910,924 B2 * | 12/2014 | Alanko | ..................... | B60S 9/08 254/418 |
| D722,414 S * | 2/2015 | Lusty | ............................. | D34/31 |
| 2004/0004346 A1 * | 1/2004 | Humphries | ............... | B60S 9/04 280/763.1 |
| 2004/0159826 A1 * | 8/2004 | Peschmann | ............... | B60S 9/22 254/420 |
| 2009/0179400 A1 * | 7/2009 | Van Der Plaats | ......... | B60S 9/08 280/431 |
| 2012/0037862 A1 * | 2/2012 | McCarthy | ................. | B60S 9/08 254/1 |
| 2013/0092890 A1 * | 4/2013 | Alanko | ..................... | B60S 9/08 254/420 |
| 2015/0158464 A1 * | 6/2015 | Alanko | ..................... | B60S 9/08 254/105 |

* cited by examiner

*Primary Examiner* — Lee D Wilson
*Assistant Examiner* — Henry Hong
(74) *Attorney, Agent, or Firm* — Nikolai & Mersereau, P.A.; Thomas J. Nikolai

(57) ABSTRACT

A fast-adjust trailer jack has three telescoping tubular segments, an upper, an intermediate and a lower. A lead screw is used to operatively couple the upper to the intermediate and a tension spring is coupled between the intermediate and the lower to normally urge the retraction of the lower into the intermediate. A spring-biased pin and hole based detent mechanism is employed to allow setting of the degree of extension of the lower tubular segment with respect to the intermediate tubular segment.

6 Claims, 3 Drawing Sheets

FAST ADJUST TRAILER JACK

BACKGROUND OF THE INVENTION

I. Field of the Invention

This invention relates generally to trailer jacks used to support the tongue of a trailer when the trailer is not coupled to a towing vehicle, and more particularly to a trailer jack allowing for rapid deployment.

II. Description of the Prior Art

A typical trailer jack is used to support the tongue weight of a trailer when the trailer hitch is not fastened to a towing vehicle and generally comprises an upper, outer tube adapted to be coupled to the trailer tongue and a lower inner tube coupled in telescoping relation to the upper outer tube and incorporating a lead screw member that is journaled for rotation in the upper, outer tube about a longitudinal axis thereof. The lead screw is threaded into a traveling nut that is welded to the inner wall of the lower, inner tube so that when the lead screw is rotated by a crank, the lower inner tube can be made to project further from or retract back into the lumen on the upper outer tube, depending on the direction of rotation of the crank. A disadvantage of this type of jack is that it takes many rotations of the crank to move the lower tube between a retracted disposition needed to provide ground clearance when the trailer is being towed and an extended disposition needed to elevate the trailer tongue when decoupling the trailer tongue receiver from the ball hitch of the towing vehicle.

The Ryan U.S. Pat. No. 2,939,679 addresses this problem by providing a tension spring that is operatively coupled between the upper and lower tubes, allowing a user to step down on a footplate affixed to a bottom end of the lower tube to rapidly move the footplate against the ground and lock the lower tube in its extended position. At this point, only a few turns of the crank are needed to raise the trailer tongue sufficiently to uncouple the trailer from the towing vehicle. When it is desired to retract the lower tube into the upper one, when the lock is released, the tension spring works against gravity to lift the foot sufficiently to provide the needed ground clearance. Because the jack of the '679 patent comprises only two telescoping tubes, it is unduly long and cumbersome.

The McMahan U.S. Pat. No. 8,091,922 teaches another way of obtaining a fast initial adjustment of the jack, followed by a final adjustment using a lead screw where the final adjustment makes it only necessary to make a few turns of the screw to achieve a desired elevation. The jack is comprised of an inner tubular member nested within an outer tubular member, a collar, a housing and a pin. The inner member is threadedly connected to the outer member with a bolt having a crank attached at one end. The bolt enables incremental adjustments in the trailer height by extension and refraction of the inner member with respect to the outer member. The connected outer and inner members are secured to the trailer with a pin inserted through the housing, a hole in the collar and one of a plurality of longitudinal holes in the outer member. To create rapid gross adjustment in the trailer height, the pin is retracted, a different hole in the outer member is registered with the hole in the collar and the pin is then reinserted. Having a plurality of longitudinally spaced holes in the outer member necessarily weakens the structural integrity of the jack.

The Wilson U.S. Pat. No. 4,769,864 describes a trailer jack having a tubular outer housing adapted to be attached to a trailer vehicle with second and third tubular members slidably disposed therein. A locking mechanism is provided adjacent an aperture in a wall of the second tubular member for positioning a pin in selectively alignable apertures in a wall of the third tubular member, thereby preventing relative movement between the second and third tubular members. A tension spring engages both the second and third tubular members, the spring being located within the third tubular member. It functions to bias the third tubular member toward a retracted position with respect to the second tubular member. A crank is provided for rotating a threaded screw member for moving the second tubular member with respect to the tubular outer housing.

The present invention is deemed to be an advancement over the prior art in affording an improved releasable locking arrangement that affords greater selectivity over the initial positioning of the lower tubular member with respect to the intermediate member.

SUMMARY OF THE INVENTION

The present invention comprises a trailer jack adapted for connection to a tongue of a trailer that comprises an upper tubular member of a predetermined cross-sectional shape, an intermediate tubular member of the same cross-sectional shape that is telescopingly received within the upper tubular member. A lower tubular member is telescopingly received within the intermediate tubular member and an elongate tension spring is disposed within the lower tubular member and operatively coupled for normally urging at least a portion of the lower tubular member into the intermediate tubular member.

A swivel bracket is affixed to the exterior of the upper tubular member and is adapted to attach the trailer jack to the tongue of a trailer in a way that permits the jack to be rotated between a vertical and a horizontal orientation with respect to the trailer tongue. A threaded rod is journaled for rotation about a central longitudinal axis of the upper tubular member and cooperates with a traveling nut affixed to the interior of the intermediate tubular member such that rotation of the threaded rod by a hand crank displaces the upper tubular member with respect to the intermediate tubular member and the lower tubular member.

A plurality of regularly, longitudinally-spaced detent holes are formed on an exterior wall of the lower tubular member. A latch is pivotally secured to a lower end portion of the intermediate tubular member and comprises a pin with a flat plate affixed intermediate its ends and that is normally urged by a compression spring into engagement with a selected one of the regularly longitudinally spaced holes on the lower tubular member for releasably locking the lower tubular member with respect to the intermediate tubular member. The latch further comprises a pedal plate positioned such that depression thereof against a force provided by the same compression spring for the pin disengages the pin from a selected one of the holes allowing the elongate tension spring to retract the lower tubular member into the intermediate one. For increased safety against inadvertent tripping of the jack's release, a locking pin can be inserted that cooperates with the flat plate to prevent movement of the spring-biased pin.

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENTS

Figure 1:
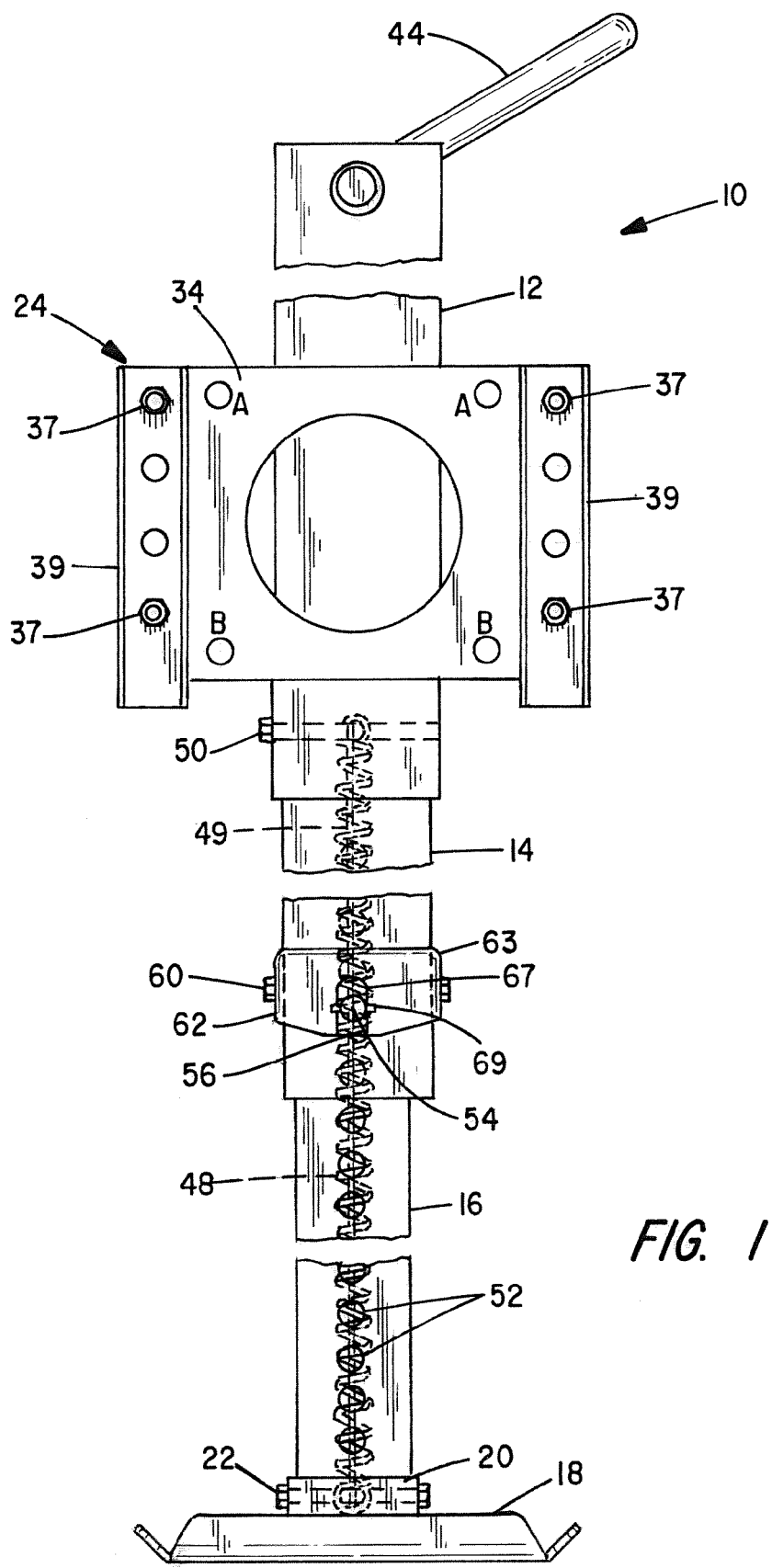
FIG. 1 is a rear elevation view of the trailer jack comprising a preferred embodiment of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

As seen in FIG. 1, the trailer jack 10 comprises three telescoping segments, namely, an upper, outer tubular member 12 of rectangular cross-section, an intermediate tubular member 14 also of rectangular cross-section but having an outer dimension capable of being slidingly fit within the lumen of the upper, outer tubular member 12. Fitting telescopically into the central lumen of the intermediate tubular member 14 is a lower tubular member 16 at the lower end of which is secured a footplate 18. The footplate 18 has a rectangular collar 20 dimensioned to fit about the lower end of the lower tubular member 16. A bolt 22 passes through aligned apertures in the collar 20 and the lower tubular member 16 as a mode of attachment.

Welded to the upper tubular member 12 is a swivel mounting bracket assembly indicated generally by numeral 24. It comprises a base member 26 having arms, as at 28, 30, that straddle and are welded to opposed side surfaces of the upper, outer tubular member 12 and secured to the base member 26 is a swivel plate 34. The swivel plate 34 has a cylindrical sleeve 35 (FIG. 2) rotatably secured in a circular aperture 32 in the base member 26. A wire ring retainer 33 prevents uncoupling of the sleeve 35 from the base member 36.

The swivel plate 34 is adapted to be connected to a trailer tongue by suitable fasteners, such as bolts 37 that pass through clamping bars 39. The jack mounting bracket assembly 24 thus permits the jack to be swung between a vertical disposition when supporting the trailer tongue to a horizontal position when the trailer is being towed. A U-shaped handle 41 extends through the arms 28 and 30 of the mounting bracket 26 and a pair of compression springs 43 surround portions of the legs of the U-shaped handle 41 and apply a biasing force urging end portions of the U-shaped handle through aligned apertures in the base portion of the mounting bracket and the swivel plate 34. This serves to releasably lock the jack assembly in either a horizontal disposition with respect to the tongue of a trailer or in a vertical disposition depending upon which of the aperture pairs on the swivel plate 34 (A-A or A-B) are brought into alignment with the legs of the U-shaped handle 41.

Figure 2:
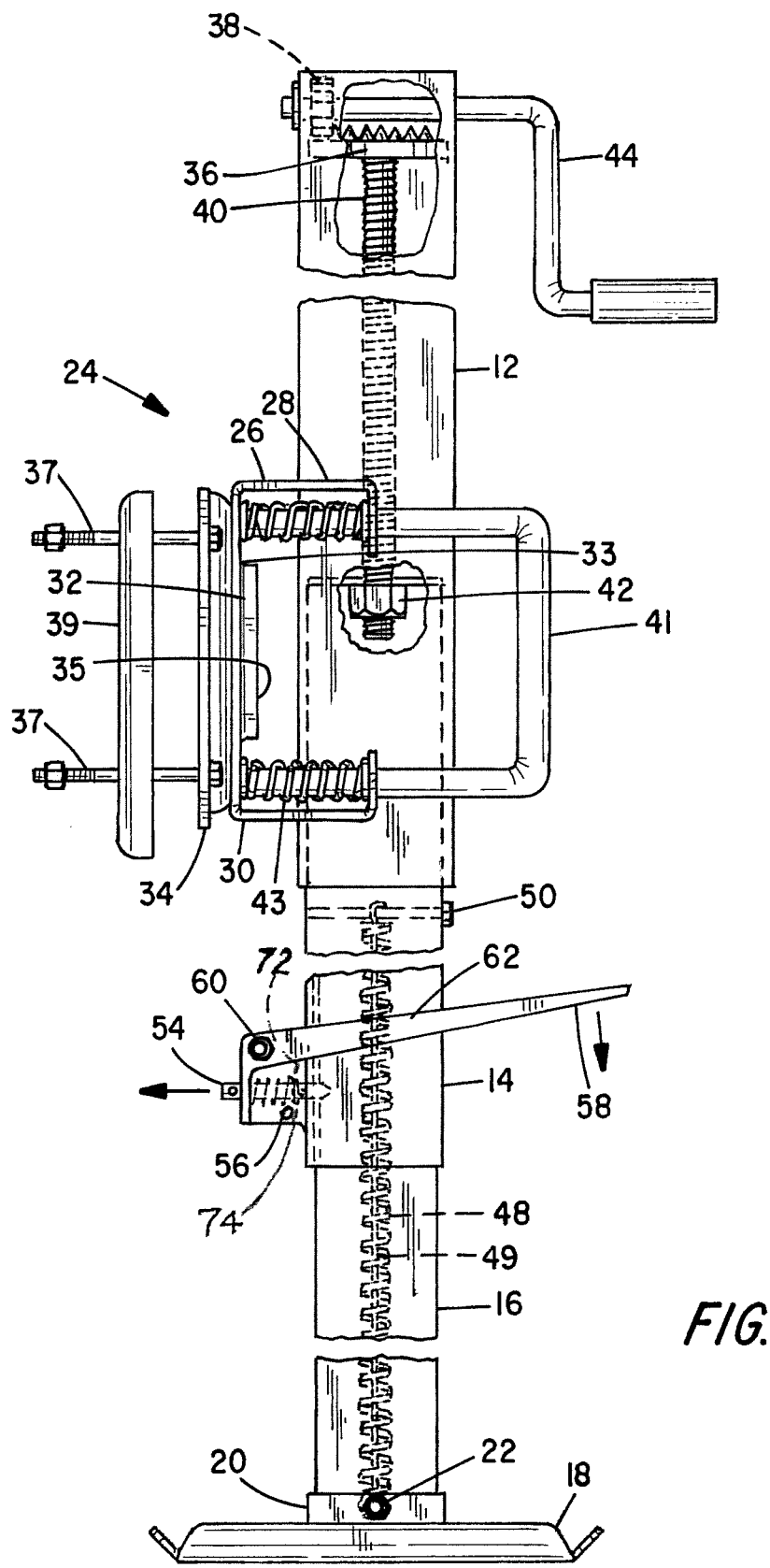
FIG. 2 is a side elevation thereof.

As can be seen in the partial, cut-away view of FIG. 2, journaled for rotation in a bearing 36 mounted close to the top of the jack is a threaded lead screw 40 that is threaded through a traveling nut 42 welded to the inside wall of the intermediate tubular member 14. Thus, by turning the crank 44 that is joined to the upper end of the lead screw 40 by a bevel gear connection 38, the lead screw 40 is rotated, causing the intermediate tubular member 14 to be drawn into the lumen of the upper, outer tubular member 12 or moved outward so as to project further out from the lower end of the upper tubular member 12, depending upon the direction of rotation of the crank 44.

Contained within the lumen of the lower tubular member 16 is a tension spring 48 whose lower end is hooked about the bolt 22 used to fasten the foot member 18 to the lower end of the tubular member 16. The spring extends upward through the lumen of the lower tubular member 16 and hooks about a pin 50 that extends transversely through opposed side walls of the intermediate tubular member 14. Thus, the spring 48 normally tries to retract the lower tubular member 16 into the intermediate member 14. A cable 49 is also connected between the bolts 22 and 50 whose length prevents the lower tubular member 16 from coming free of the lumen of the intermediate tubular member 14.

Figure 3:
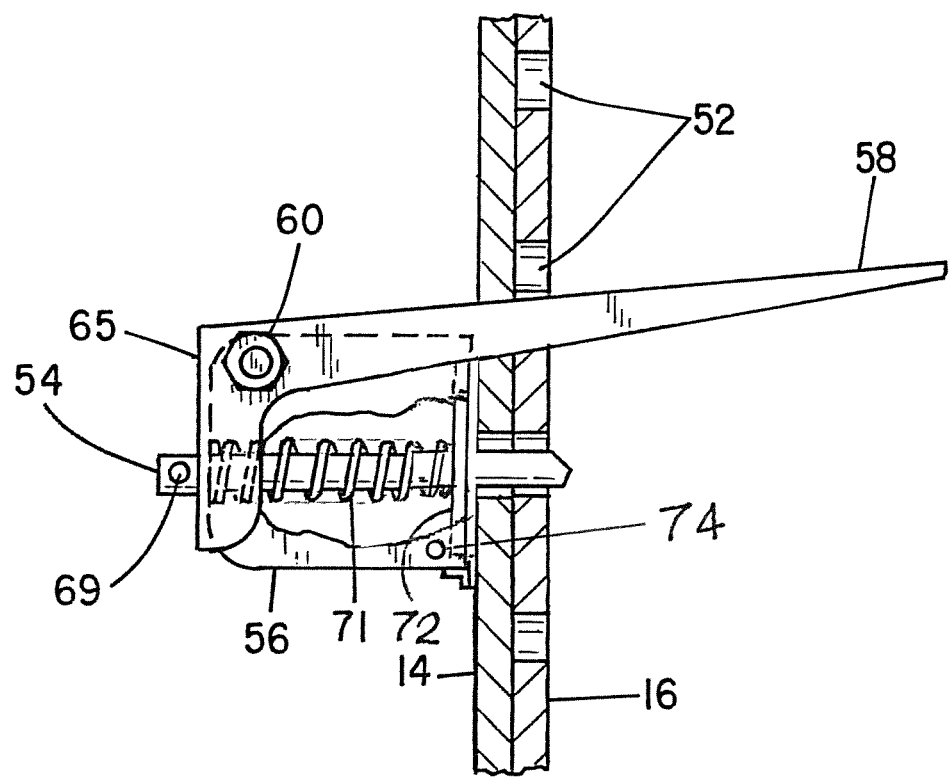
FIG. 3 is a partial view showing the spring biased detent employed.

As seen in the partial detail view of FIGS. 1 and 3, there is formed in one side surface of the lower tubular member 16 a series of longitudinally spaced holes 52 that are spaced apart approximately ½ inch although this spacing is not critical and can be as small as ¼ inch and as large as ¾ inch. The holes 52 thus form a detent surface along the length dimension of the lower tubular member 16 that is made to cooperate with a spring-loaded pin 54. More particularly, welded or otherwise affixed to an outer wall of the intermediate tubular member 14 proximate its lower end is a block-like housing 56 in which is disposed a spring biased pin, the end of which can best be seen in FIG. 3. Pivotally joined to the housing 56 is a pedal member 58 that pivotally joins to the housing 56 by means of a hinge pin 60. The pedal member 58 has opposed arms 62 that straddle the lower end portion of the intermediate tubular member 14 and the pin 54 is operatively coupled to the ends of the arms 62. More particularly, an angled plate 63 is welded to the opposed arms and a rear end portion thereof wraps down over the housing 56. The portion of the angled plate 63 that wraps down is identified by the numeral 65 and as seen in FIG. 1, it includes a U-shaped cutout 67 through which a rear end of the pin 54 extends. A roll pin 69 extends through the pin 54 and its length is such that it extends beyond the opposed side edges of the cutout 67. It can be seen then that downward depression of the pedal member 58 pivots the pedal arms about the hinge pin 60 and in doing so forces the pin 54 rearward against the force of its biasing spring 71 to the point where the pin 54 no longer engages one of the holes 52.

With continued reference to FIG. 3, there can be observed a steel plate 72 affixed to the pin 54 intermediate its ends and with compression spring 71 pressing on it. A locking bolt, as at 74, when inserted through aligned apertures in the housing 56, abuts the plate 72 to block the ability of the pin 54 to move, thus providing a safety feature preventing inadvertent release of the jack.

Having described the constructional features of the jack of the present invention, consideration will next be given to its mode of operation.

Let it be assumed that the trailer had been traveling over the road and has arrived at a spot where the trailer is to be parked. At this point, the longitudinal axis of the jack will be generally horizontal and aligned with the tongue of the trailer. The lower tubular member 16 will be retracted within the intermediate tubular member 14 under action of the tension spring 48. The operator will first pull the U-shaped handle 41 that secures the jack in its horizontal disposition and will rotate the jack about the cylindrical swivel 32 that connects the base member 26 to the swivel plate 34, the swivel plate 34 being joined to the tongue of the trailer. Next, by placing one's foot on the plate 18 and stepping down, the lower tubular member 16 will be displaced outward from the lower end of the intermediate tubular member 14 against the force of the tension spring 48. The pin 54 will click through the holes 52 and will ultimately stop in one of the holes determined by the length of travel of the lower tubular member needed before the footpad 18 abuts the ground. The operator may now insert the safety locking bolt 74 to prevent release of the lower tubular member from its engagement with the intermediate tubular member and turn the crank 44 only a few turns in a direction that will elevate the trailer tongue by displacing the intermediate tubular member from the lumen of the upper, outer tubular member 12. This decouples the trailer's hitch receiver from the ball hitch on the towing vehicle.

Later, when it is desired to again transport the trailer, the operator will maneuver the towing vehicle so that a hitch ball on the towing vehicle will be positioned directly beneath the hitch ball receiver on the end of the trailer tongue and then the crank 44 may again be rotated only a few times in a direction to lower the trailer tongue so that the receiver will engage the hitch ball. Now, by simply removing the locking bolt 74 so that it no longer prevents movement of the plate 72 and the spring-biased pin 54 and then stepping on the pedal 58 or otherwise pushing it down, the spring-biased pin 54 will become disengaged from the hole 52 in which it resided, allowing the tension spring 48 to rapidly draw the lower tubular member 16 into the intermediate tubular member 14 to thereby provide sufficient ground clearance to permit over-the-road travel. If it is contemplated that the trailer is to be taken off-road, additional ground clearance can be achieved by again rotating the jack about the swivel 32 so that the longitudinal axis of the jack will again be horizontally disposed alongside the trailer's tongue.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A trailer jack adapted for connection to a tongue of a trailer comprising:
   (a) an upper tubular member of a predetermined cross-sectional shape;
   (b) an intermediate tubular member of said predetermined cross-sectional shape telescopingly received within the upper tubular member;
   (c) a lower tubular member telescopingly received within the intermediate tubular member;
   (d) a mounting bracket affixed to the exterior of the upper tubular member and adapted to attach the trailer jack to a tongue of a trailer and swivels about a horizontal axis;
   (e) a threaded rod journaled for rotation about a central longitudinal axis of the upper tubular member;
   (f) a travelling nut affixed to the interior of the intermediate tubular member and cooperating with the threaded rod;
   (g) a tension spring member disposed within the lower tubular member and operatively coupled for normally urging at least a portion of the lower tubular member into the intermediate tubular member;
   (h) a plurality of regularly longitudinally spaced holes in the lower tubular member;
   (i) a latch pivotally secured to a lower end portion of the intermediate tubular member and with a spring-biased latch pin normally urged into engagement with one of the holes by a compression spring for releasably locking the lower tubular member with respect to the intermediate tubular member,
   (j) a pedal member having an opposed pair of arms straddling a lower end portion of the intermediate tubular member and operatively coupled to the spring-biased latch pin for displacing the latch pin against the force of the spring that biases the latch pin upon depression of the pedal about a hinge pin that pivotally joins the pedal arms to the intermediate tubular member, and
   (k) a hand crank for rotating the threaded rod whereby the upper tubular member is displaced with respect to the intermediate tubular member and lower tubular member.

2. The trailer jack as in claim 1 wherein the mounting bracket comprises a base member rigidly attached to the exterior of the upper tubular member and a swivel plate rotatably affixed to the base member.

3. The trailer jack of claim 1 and further including a foot plate affixed to a free end of the lower tubular member.

4. The trailer jack of claim 1 wherein the regular longitudinally spacing between the holes is in a range from about ¼ inch to ¾ inch.

5. The trailer jack as in claim wherein the latch comprises a steel block housing welded to an exterior rear surface of the intermediate tubular member, the block housing containing said spring-biased latch pin, the latch pin having a rear portion extending outward from the block housing, the pedal being pivotably joined to the block housing and having the pair of arms straddling opposed side surfaces of the intermediate tubular member and where the arms are joined by a rear plate that is wrapped about a rear side of the block housing, the rear plate having a slot through which the extending rear portion of the spring-biased latch pin projects, the spring-biased latch pin having a transversely extending member for engaging material of the rear plate defining the slot whereby depression of the pedal retracts the spring-biased latch pin from said one of the holes and thereby unlocking the lower tubular member from the intermediate tubular member.

6. The trailer jack as in claim 5 and further including a steel plate affixed to the spring-biased pin intermediate opposed ends of the spring-biased latch pin and wherein the block housing includes an aperture therethrough adapted to removably receive a locking bolt and which when present, engages the steel plate and prevents movement of the spring-biased latch pin.

* * * * *